Patented Sept. 10, 1946

2,407,390

UNITED STATES PATENT OFFICE 2,407,390

CHEMICAL PROCESS

Charles H. Watkins, Cranford, N. J., assignor to Standard Oil Development Company, a corporation of Delaware No Drawing. Application April 17, 1943, Serial No. 483,498

16 Claims. (Cl. 260—683.4)

The present invention relates to improvements in the art of alkylating propylene with isobutane employing aluminum chloride-hydrocarbon complex catalyst.

The alkylation of propylene with isobutane in the presence of strong sulfuric acid, say over 90% acid concentration, has not proved satisfactory because of excessive acid consumption.

I have discovered a method of alkylating propylene with isobutane, and the gist of the invention resides in employing aluminum chloride-hydrocarbon complex catalyst which I have found to possess long catalyst life and to be capable of producing good yields of alkylate of high quality.

The main object of my invention, therefore, is to synthesize hydrocarbons, boiling in the gasoline range, of good anti-detonation quality in good yields, from propylene and isobutane by alkylation.

At the outset, I wish to point out that I have discovered that a certain aluminum chloride-hydrocarbon complex formed by contacting isobutane, propylene and aluminum chloride provides an active catalyst for the alkylation of propylene with isobutane which I have also found remains active over an extended period of time. I have further found that a small amount of a volatile halide, such as ethyl chloride, hydrogen chloride, or methyl chloride, when added to the reaction mass, improves the performance of catalyst and is otherwise desirable.

Since the preparation of the catalyst is an important feature of my invention, I shall now describe in detail the method of preparing the same. I charged ½ lb. of $AlCl_3$ to a turbo mixer and then added 69 gram mols of liquefied isobutane containing 5% by volume of ethyl chloride. The mixture was thoroughly agitated. At 70° F., 23 gram mols of propylene were added over a period of 2 hours and 18 minutes while stirring. The stirring was continued for ¼ of an hour following the addition of the olefin. The pressure averaged 110 lbs./sq. in. during the operation. The mixture was permitted to remain quiescent to allow stratification and settling of the material into a lower brown, mobile liquid layer containing an $AlCl_3$ hydrocarbon complex and an upper product layer (i. e. an alkylate formed by reacting propylene with isobutane). I repeated the operation as previously outlined 26 times except that no additional $AlCl_3$ was added until the 25th run and as otherwise indicated in the below Table I:

TABLE I

Propylene-isobutane alkylation—3 gallon turbo mixer—batch operation—catalyst: 227 grams of $AlCl_3$ as a hydrocarbon complex—promoter: ethyl chloride

| | Run No. EA7— | | | | | | | | | | | | | | | | | | | | | | | | | |
|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | [2]18 | 19 | 20 | 21 | 22 | 23 | 24 | 25 | 26 |
| Reaction temp., °F | 71 | 71 | 72 | 70 | 70 | 72 | 70 | 71 | 69 | 70 | 50 | 49 | 70 | 40 | 91 | 69 | 90 | 70 | 71 | 70 | 70 | 71 | 70 | [5]150 | [5]72 | [6]72 |
| EtCl, vol. % on $C_4$ | | | | 5 | | | | 1.6 | 0.5 | 0.2 | 0.5 | 0.2 | 0.2 | 0.2 | Tr. | Tr. | Tr. | 0.2 | 0.2 | 5 | [3] | 0.5 | 0.5 | 5 | 0.5 | 0.5 |
| Iso-$C_4$ charged, gram mols | 69 | | | | | | | | | 39 | | | | | | | 40 | 39 | 60 | | | | | 39 | | |
| Propylene charged, gram mols | 23 | | | | | | | | | 13 | | | | | | | 8 | 13 | 20 | | | | | 13 | | |
| Isobutane/propylene mol ratio | 3 | | | | | | | | | 3 | | | | | | | 5 | | | | | | 3 | | | |
| Propylene addition rate, gram mols/hr | 8 | 10 | 10 | 10 | 10 | 13 | 8 | 10 | 10 | 10 | 10 | 10 | 9 | 10 | 10 | 9 | 3 | 9 | 10 | 10 | 10 | 8 | 8 | 8 | 8 | 8 |
| Total alkylate yield, Wt. % (based on olefin) | 256 | 211 | 229 | 241 | 252 | 254 | 250 | 239 | 218 | 224 | 226 | 234 | 229 | 212 | 240 | 214 | 225 | 191 | 215 | 212 | 211 | 219 | 152 | 156 | 220 | 183 |
| Product distribution: | | | | | | | | | | | | | | | | | | | | | | | | | | |
| 60–110° F. cut ($C_5$), vol. % | 6 | 7 | 15 | 14 | 16 | 18 | 21 | 6 | 8 | 2 | 2 | 1 | 0 | 0 | 0 | 2 | 2 | 0 | 0 | 0 | 2 | 0 | 0 | 2 | 1 | 0 |
| 110–165° F. cut ($C_6$), vol. % | 12 | 13 | 13 | 16 | 16 | 18 | 16 | 18 | 10 | 4 | 3 | 2 | 3 | 10 | 3 | 3 | 2 | 2 | 1 | 1 | 4 | 3 | 5 | 4 | 2 | 2 |
| 165–210° F. cut ($C_7$), vol. % | 47 | 41 | 38 | 39 | 35 | 30 | 31 | 45 | 56 | 77 | 71 | 70 | 75 | 60 | 69 | 66 | 71 | 65 | 57 | 60 | 45 | 43 | 25 | 31 | 60 | 47 |
| 210–265° F. cut ($C_8$), vol. % | 11 | 10 | 12 | 12 | 14 | 16 | 14 | 14 | 9 | 3 | 4 | 4 | 4 | 3 | 3 | 1 | 2 | 5 | 2 | 2 | 4 | 4 | 9 | 7 | 1 | 4 |
| 265–335° F. cut ($C_9$), vol. % | 11 | 12 | 11 | 9 | 9 | 9 | 9 | 9 | 9 | 9 | 12 | 12 | 11 | 13 | 13 | 11 | 14 }28 | | 13 | 14 | 13 | 14 }61 | | 15 | 10 | 15 |
| 335° F.+bottoms ($C_{10}$+), vol. % | 13 | 17 | 11 | 10 | 10 | 9 | 9 | 9 | 8 | 5 | 8 | 11 | 7 | 14 | 12 | 17 | 9 | | 27 | 23 | 32 | 36 | | 41 | 26 | 32 |
| Product quality: | | | | | | | | | | | | | | | | | | | | | | | | | | |
| A. S. T. M. Oct. No. (60–265° F. cut) | 84.2 | | | 82.0 | | | 82.1 | | | 183.3 | 185.5 | 184.5 | 184.2 | | 186.3 | | 186.3 | | 189.5 | | | | | | | |
| Bromine No.(60–265° F.cut) | Nil | | | | | | | | | | | Nil | Nil | | Nil | | Nil | | | | | | | | | |

[1] $C_7$ cut.
[2] 600 ccs. of 265° F.+ bottoms from previous runs added to reactor in this run.
[3] 15 gms. HCl added in Run 21 (equivalent to approx. 0.05 lb. HCl/gal. alkylate).
[4] 75 p. s. i. $H_2$ imposed on reactor.
[5] 25 gms. of $AlCl_3$ added to reactor in addition to the 227 gms. originally.
[6] 10 gms. of $AlCl_3$ added to reactor in addition to the 227 gms. originally In the foregoing runs, it will be noted from the table that during the first seven runs the amount of ethyl chloride was unchanged at 5%, but thereafter it was varied, and from the data, it is clear that about 0.2% to 0.5% is optimum. This figure was verified in other runs. Also, the temperature was varied up to 150° F. (Run 24), but the data indicates that best results are obtainable at about 70° F. The desired cut or fraction was, of course, the $C_7$ fraction and the undesired fraction (or one of them) was the $C_{10}$ fraction. It will be noted that after the 17th run, the $C_{10}$ fraction increased, showing that the catalyst was losing selectivity. The addition of $AlCl_3$ caused increase in the amount of $C_7$ hydrocarbons from 31% to 60%.

The foregoing runs were "depletion" runs, to determine among other things, how long a time would elapse before it would be necessary to add $AlCl_3$. Subsequent test runs, using about 5.1% $AlCl_3$ by weight present as hydrocarbon complex based on total hydrocarbons, gave best results. Table II below shows this in six runs:

TABLE II

Propylene-isobutane alkylation—$AlCl_3$-hydrocarbon complex catalyst—reaction temperature: 70° F.—batch operation

[Effect of catalyst/hydrocarbon weight ratio]

| | [1] Wt. % $AlCl_3$ | | | | |
|---|---|---|---|---|---|
| | 0.5 | 1.1 | 2.5 | 5.1 | 20 |
| Total alkylate yield, wt. % (based on olefin) | 3 | 180 | 149 | 242 | 265 |
| Product distribution, vol. %: | | | | | |
| 60–110° F. cut | | 0 | 1 | 7 | 37 |
| 110–165° F. cut | | 14 | 2 | 10 | 21 |
| 165–210° F. cut | | 22 | 25 | 61 | 20 |
| 210–265° F. cut | | 4 | 3 | 8 | 11 |
| 265–335° F. cut | | 11 | 6 | 9 | } 11 |
| 335° F. + bottoms | | 49 | 63 | 5 | |

[1] $AlCl_3$ present as a hydrocarbon complex. Percentage based on total hydrocarbons.

The above runs show that 0.5% $AlCl_3$ produce a virtually inactive catalyst while 20% is an amount causing the formation of too great a quantity of light ends. Further, runs showed that from 3 to 7% $AlCl_3$ gave good results.

My process may be operated continuously, and the best procedure is to flow the isobutane and propylene feeds through a vessel or receptacle containing the $AlCl_3$. For 4 or 5 hours, when the process is started, the $AlCl_3$-hydrocarbon complex is formed and after that induction period, the process is operated to maintain the optimum conditions indicated in the preceding tables. As to contact times, good results are achieved by permitting the reactants to contact each other and the catalyst for a period of from about ½ hour to 1¼ hours. Also, while the isobutane should be in excess over the propylene in the reaction mass, the mol ratio of isobutane to propylene may vary from 2 to 10 mols of isobutane per mol of propylene. The best temperature range in the reaction zone is from about 70° to 90°, although temperatures from 50° to 150° may be used, and the preferred pressure range therein is from 75 to 250 lbs./sq. in. gauge. With respect to the activation, HCl may be used in amounts from 0.001 to 5% based on the isobutane. From 0.1 to 10% ethyl chloride or methyl chloride may be used for a like purpose.

Numerous modifications of my invention falling within the spirit thereof may be made by those familiar with this art.

I claim:

1. Process of alkylating propylene with isobutane which comprises contacting the propylene with an excess of isobutane in the presence of a liquid aluminum chloride-hydrocarbon complex as the alkylating catalyst formed by contacting for an extended period of time aluminum chloride with isobutane and propylene.

2. The method set forth in claim 1 in which the alkylation process is carried out at a temperature within the range of about 50–150° F.

3. The process set forth in claim 1, in which a promoter is used which is one of the class consisting of alkyl halides and HCl.

4. The process set forth in claim 1 in which from 0.001–5% by weight of hydrogen chloride based on the isobutane is employed as a promoter.

5. The process set forth in claim 1 in which from 0.01 to 10% by weight of ethyl chloride based on the isobutane is employed as a promoter.

6. The process of claim 1 in which from 0.01 to 10% by weight of methyl chloride based on the isobutane is employed as a promoter.

7. The method set forth in claim 1 in which the liquid aluminum chloride-hydrocarbon complex catalyst is prepared in situ under reaction conditions using the olefin and isoparaffin which are to be alkylated in contacting relationship with the aluminum chloride.

8. The method of claim 1 performed in the presence of from 0.2 to 0.5% ethyl chloride based on the isobutane, at temperatures of from 70° to 90° F., under superatmospheric pressure and during contact times of from ½ to 1¼ hours.

9. The method of claim 1 in which the pressure ranges from 75 to 250 lbs./sq. in.

10. The method of claim 1 performed continuously by adding $AlCl_3$ to the reactants so as to maintain an $AlCl_3$ hydrocarbon complex to total hydrocarbons, weight percentage of about 5, adding the reactants continuously and withdrawing product continuously.

11. In the process of alkylating an olefin with an excess of isoparaffin in the presence of an aluminum chloride-hydrocarbon complex catalyst the improvement which comprises contacting aluminum chloride with isobutane and propylene for a period of time sufficient to form a liquid aluminum chloride-hydrocarbon complex catalyst and contacting propylene with an excess of isobutane in the presence of said catalyst.

12. In the process of alkylating an olefin with an excess of an isoparaffin in the presence of an aluminum chloride-hydrocarbon complex catalyst the improvement which comprises mixing aluminum chloride with liquefied isobutane, agitating the mixture until the temperature reaches about 70°F., admixing propylene to the mixture, agitating the mixture for a time sufficient to convert the aluminum chloride into a liquid aluminum chloride-hydrocarbon complex, allowing the mixture to stratify and contacting the lower liquid layer comprising said liquid aluminum chloride-hydrocarbon complex with additional amounts of propylene and excess isobutane.

13. The process set forth in claim 12 in which an excess of isobutane based on the propylene added is mixed with the aluminum chloride.

14. The process set forth in claim 12 in which the isobutane is mixed with the aluminum chloride in the presence of a promoter selected from the class consisting of alkyl halides and hydrogen chloride.

15. The process set forth in claim 12 in which the alkylation is carried out in the presence of about 3-7% by weight of aluminum chloride based on hydrocarbons, said aluminum chloride being present in the form of a liquid aluminum chloride hydrocarbon complex catalyst.

16. The process set forth in claim 11 in which isobutane and propylene are contacted with aluminum chloride for about 4-5 hours to form said liquid aluminum chloride-hydrocarbon complex catalyst.

CHARLES H. WATKINS.